US011647564B2

(12) United States Patent
Jung

(10) Patent No.: US 11,647,564 B2
(45) Date of Patent: *May 9, 2023

(54) APPARATUS AND METHOD FOR PERFORMING DATA COMMUNICATION IN NAN PROTOCOL-BASED NETWORK ENVIRONMENT

(71) Applicant: SAMSUNG ELECTRONICS CO., LTD., Suwon-si (KR)

(72) Inventor: Buseop Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,665

(22) Filed: Apr. 25, 2022

(65) Prior Publication Data

US 2022/0256648 A1   Aug. 11, 2022

Related U.S. Application Data

(63) Continuation of application No. 17/056,598, filed as application No. PCT/KR2019/005075 on Apr. 26, 2019, now Pat. No. 11,317,468.

(30) Foreign Application Priority Data

Jun. 28, 2018   (KR) .......................... 10-2018-0074771

(51) Int. Cl.
*H04W 88/06*  (2009.01)
*H04W 40/24*  (2009.01)

(52) U.S. Cl.
CPC ........... *H04W 88/06* (2013.01); *H04W 40/24* (2013.01)

(58) Field of Classification Search
CPC ..... H04W 88/06; H04W 40/24; H04W 84/18; H04W 12/08; H04W 40/246
See application file for complete search history.

(56) References Cited

U.S. PATENT DOCUMENTS 8,209,403 B2 *  6/2012  Szabo ..................... G06F 8/656
                                                  714/1
8,937,921 B2 *  1/2015  Hui ........................ H04W 72/04
                                                  455/450

(Continued)

FOREIGN PATENT DOCUMENTS

KR   10-2016-0117501       10/2016
KR   10-2017-0042639        4/2017

(Continued)

OTHER PUBLICATIONS

International Search Report for PCT/KR2019/005075, dated Aug. 21, 2019, 6 pages.

(Continued)

*Primary Examiner* — Julio R Perez
(74) *Attorney, Agent, or Firm* — Nixon & Vanderhye, P.C.

(57) ABSTRACT

An example electronic device supporting a neighbor awareness networking (NAN) protocol and a heterogeneous protocol different from the NAN protocol stores first information associated with a link established based on the heterogeneous protocol, transmits a message including the first information to an external electronic device included in a NAN cluster, via a wireless communication circuitry, receives a NAN data path (NDP) request message including second information associated with an NDP from the external electronic device, transmits an NDP response message to the external electronic device based at least in part on the second information and the first information, and performs (Continued)

data communication with the external electronic device based on the NDP.

20 Claims, 7 Drawing Sheets

(56) References Cited

U.S. PATENT DOCUMENTS

| | | | |
|---|---|---|---|
| 9,036,632 B2* | 5/2015 | Erickson | H04L 9/3263 |
| | | | 370/392 |
| 9,086,499 B2* | 7/2015 | Medeiros | H04L 67/125 |
| 9,480,013 B2* | 10/2016 | Fang | H04W 8/005 |
| 9,648,485 B2 | 5/2017 | Abraham et al. | |
| 9,888,438 B2 | 2/2018 | Fang et al. | |
| 10,021,567 B2 | 7/2018 | Abraham et al. | |
| 10,051,469 B2 | 8/2018 | Abraham et al. | |
| 10,051,470 B2 | 8/2018 | Abraham et al. | |
| 10,129,900 B2 | 11/2018 | Park et al. | |
| 10,306,670 B2* | 5/2019 | Reisslein | H04W 16/04 |
| 10,389,854 B2* | 8/2019 | Cheng | H04L 69/08 |
| 10,499,408 B2 | 12/2019 | Park et al. | |
| 10,743,307 B2* | 8/2020 | Patil | H04W 72/0446 |
| 10,912,054 B2* | 2/2021 | Venkataraman | H04W 76/16 |
| 11,082,921 B2* | 8/2021 | Jung | H04W 88/04 |
| 11,102,702 B2* | 8/2021 | Ernst | H04W 48/16 |
| 11,115,303 B2* | 9/2021 | Sizer | H04L 43/0817 |
| 11,153,808 B2* | 10/2021 | Fang | H04L 5/0048 |
| 11,194,500 B2* | 12/2021 | Kaushik | G06F 3/067 |
| 2017/0201866 A1 | 7/2017 | Liu et al. | |
| 2017/0366957 A1 | 12/2017 | Oren et al. | |
| 2018/0027494 A1 | 1/2018 | Huang et al. | |
| 2018/0027601 A1 | 1/2018 | Hamachi | |
| 2021/0212167 A1* | 7/2021 | Jung | H04W 88/06 |

FOREIGN PATENT DOCUMENTS

| | | |
|---|---|---|
| KR | 10-2017-0056715 | 5/2017 |
| KR | 10-1740418 | 5/2017 |
| KR | 10-2017-0130425 | 11/2017 |
| KR | 10-2017-0132166 | 12/2017 |
| KR | 10- 2018-0038333 | 4/2018 |
| WO | 2017/052249 | 3/2017 |

OTHER PUBLICATIONS

Written Opinion of the ISA for PCT/KR2019/005075, dated Aug. 21, 2019, 6 pages.

Jung, U.S. Appl. No. 17/056,598, filed Nov. 18, 2020, allowed.

* cited by examiner

APPARATUS AND METHOD FOR PERFORMING DATA COMMUNICATION IN NAN PROTOCOL-BASED NETWORK ENVIRONMENT

CROSS-REFERENCE TO RELATED APPLICATIONS

This application is a continuation of U.S. application Ser. No. 17/056,598, filed on Nov. 18, 2020, which is the U.S. national phase of International Application No. PCT/KR2019/005075, filed Apr. 26, 2019, which designated the U.S. and claims priority to Korean Patent Application No. 10-2018-0074771, filed on Jun. 28, 2018. The contents of each of these applications are incorporated herein in their entireties.

FIELD

Various embodiments disclosed in the disclosure relate to an apparatus and method for data communication in a network environment based on a neighbor awareness networking (NAN) protocol.

DESCRIPTION OF RELATED ART

An electronic device may perform wireless communication with another electronic device using a local area network (LAN) as well as a wide area network (WAN). A neighbor awareness networking (NAN) protocol based on the NAN specification among local area networks is a protocol synchronizing a time when a message between the electronic device and the other electronic device is transmitted or received. For example, electronic devices included in the same NAN cluster may synchronize a duration for transmitting or receiving a message and may change to a sleep state in a duration except for the synchronized duration, thus reducing current consumption. The synchronized duration may be referred to as a discovery window (DW) duration.

SUMMARY

An electronic device may establish a NAN data path (NDP) based on a NAN protocol to perform secure data communication in a duration except for a DW duration with one of external electronic devices included in a NAN cluster. For example, the electronic device may exchange messages for establishing the NDP with an external electronic device in a DW duration and may determine a time resource and a channel resource (or a frequency resource) in a duration except for the DW duration, thus establishing the NDP. Because the NDP defined in the NAN protocol is based on being disconnected, the electronic device may omit another procedure (e.g., an authentication procedure) required to perform data communication. Through the NDP, the electronic device may perform data communication in a setup time faster than a wireless communication technology based on a heterogeneous protocol and may flexibly perform wireless communication with a plurality of external electronic devices.

To perform secure data communication based on the NDP, the electronic device may exchange a key or a identifier (ID) for encryption with the external electronic device. To exchange the key or the identifier, the electronic device should receive a user input selecting the key or the identifier from an upper layer (or an application layer) and the operation of receiving the user input may cause the delay of NDP establishment or inconvenience of a user operation.

Various embodiments of the disclosure may be to provide a method for establishing an NDP based on a NAN protocol without a user input in an electronic device.

In accordance with an aspect of the disclosure, an electronic device supporting a neighbor awareness networking (NAN) protocol and a heterogeneous protocol different from the NAN protocol is provided. The electronic device may include at least one antenna, a wireless communication circuitry electrically connected with the at least one antenna, a processor operatively connected with the wireless communication circuitry, and a memory operatively connected with the processor. The memory may store instructions, when executed, causing the processor to store first information associated with a link established based on the heterogeneous protocol, transmit a message including the first information to an external electronic device included in a NAN cluster, via the wireless communication circuitry, receive a NAN data path (NDP) request message including second information associated with an NDP from the external electronic device, transmit an NDP response message to the external electronic device based at least in part on the second information and the first information, and perform data communication with the external electronic device based on the NDP.

In accordance with another aspect of the disclosure, an electronic device supporting a neighbor awareness networking (NAN) protocol and a heterogeneous protocol different from the NAN protocol is provided. The electronic device may include at least one antenna, a wireless communication circuitry electrically connected with the at least one antenna, a processor operatively connected with the wireless communication circuitry, and a memory operatively connected with the processor. The memory may store instructions, when executed, causing the processor to store first information associated with a link established based on the heterogeneous protocol, receive a message including the first information from an external electronic device included in a NAN cluster, via the wireless communication circuitry, transmit a NAN data path (NDP) request message including second information generated based at least in part on first information included in the message and used to establish an NDP to the external electronic device, receive an NDP response message from the external electronic device, and perform data communication with the external electronic device based on the NDP.

In accordance with another aspect of the disclosure, an operation method of an electronic device supporting a neighbor awareness networking (NAN) protocol and a heterogeneous protocol different from the NAN protocol is provided. The operation method may include storing first information associated with a link established based on the heterogeneous protocol, transmitting a message including the first information to an external electronic device included in a NAN cluster, during a discovery window (DW) duration based on the NAN protocol, receiving a NAN data path (NDP) request message including second information associated with an NDP from the external electronic device, during the DW duration, transmitting an NDP response message to the external electronic device based at least in part on the second information and the first information, during the DW duration, and performing data communication with the external electronic device based on the NDP, during a duration except for the DW duration.

According to various embodiments disclosed in the disclosure, the electronic device may establish an NDP based on a NAN protocol without a user input, thus seamlessly performing secure data communication based on the NDP.

According to various embodiments disclosed in the disclosure, the electronic device may reduce an NDP setup time for secure data communication.

In addition, various effects ascertained directly or indirectly through the disclosure may be provided.

With regard to description of drawings, the same or similar denotations may be used for the same or similar components.

DETAILED DESCRIPTION OF EXAMPLE EMBODIMENTS

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
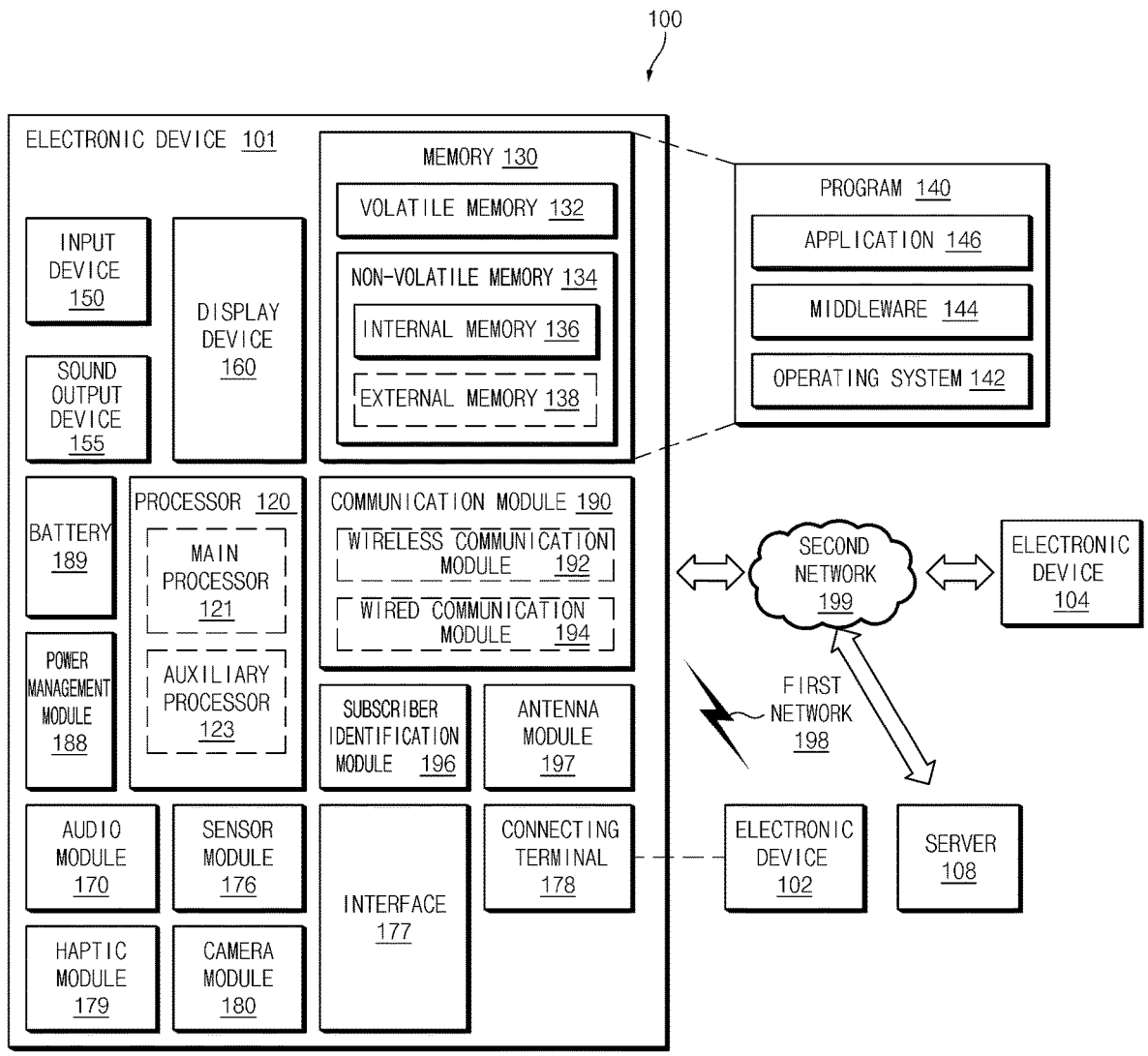
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
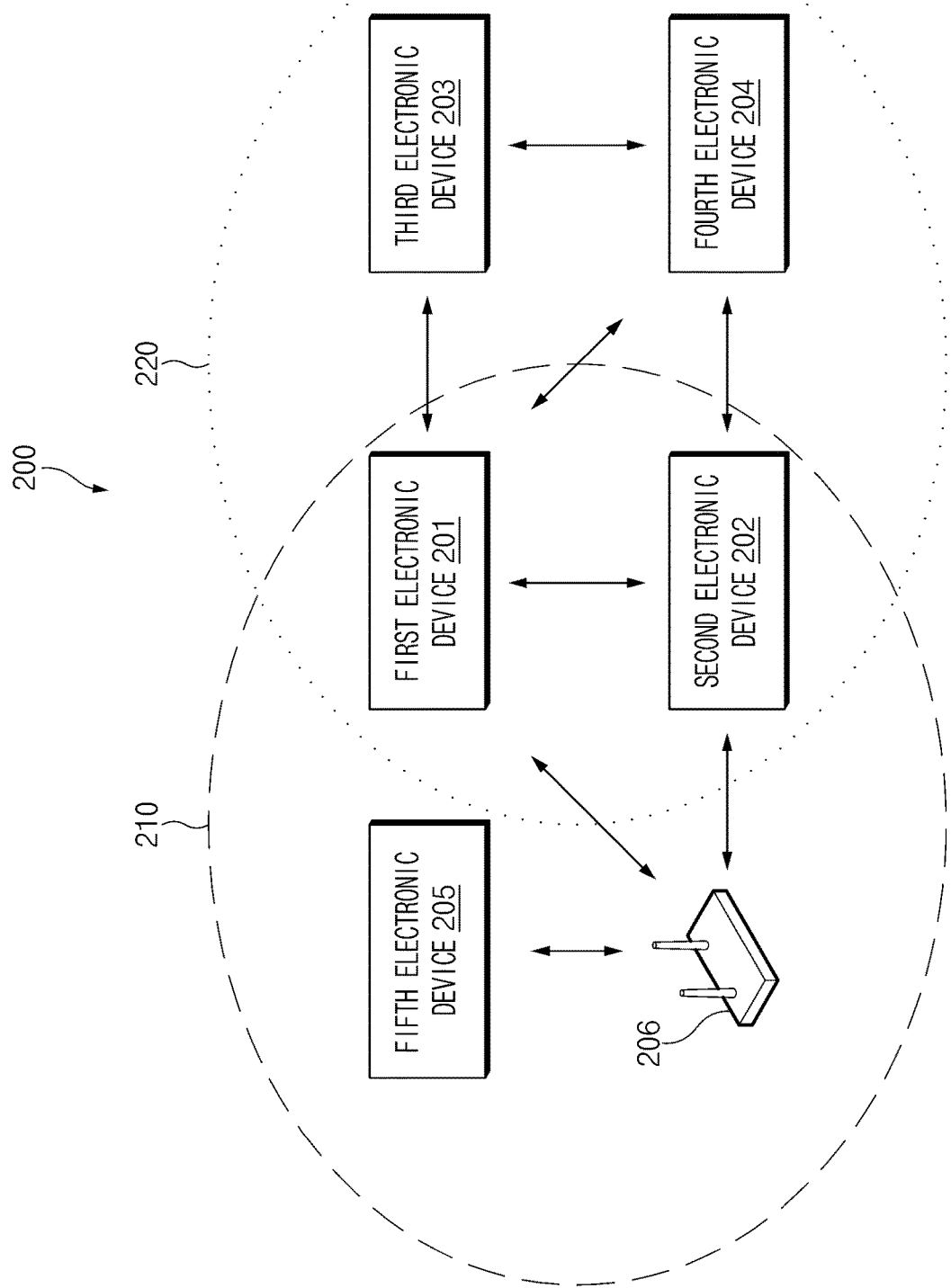
FIG. 2 illustrates a heterogeneous network environment and a NAN network environment according to various embodiments.

FIG. 2 illustrates a network environment 200 including a heterogeneous network and a NAN cluster according to various embodiments.

Referring to FIG. 2, in the network environment 200 (e.g., a network environment 100 of FIG. 1), each of a plurality of electronic devices 201, 202, 203, 204, and 205 may correspond to an electronic device 101 of FIG. 1. The plurality of electronic devices 201, 202, 203, 204, and 205 may perform short-range wireless communication based on at least one protocol. Protocols for the short-range wireless communication include at least one of, for example, wireless fidelity (Wi-Fi), Wi-Fi direct, mobile hotspot, independent basic service set (IBBS), mesh, Bluetooth, Bluetooth low energy (BLE), or NAN, which is defined by institute of electrical and electronics engineers (IEEE) 802.11.

According to an embodiment, the first electronic device 201, the second electronic device 202, and the fifth electronic device 205 may perform wireless communication based on a heterogeneous protocol except for a NAN protocol among the protocols for the short-range wireless communication. For example, the heterogeneous protocol may include at least one of Wi-Fi (or legacy Wi-Fi), Wi-Fi direct, mobile hotspot, IBBS, Bluetooth, BLE, or mesh. For example, the electronic devices 201, 202, and 205 may perform wireless communication through an access point (AP) 206 in coverage 210 of an AP 206.

According to an embodiment, the first electronic device 201, the second electronic device 202, the third electronic device 203, and the fourth electronic device 204 may perform wireless communication based on the NAN protocol. For example, the electronic devices 201, 202, 203, and 204 may form a NAN cluster 220 by synchronizing a duration (e.g., a DW duration) and a channel for transmitting and receiving a message. The electronic devices 201, 202, 203, and 204 included in the NAN cluster 220 may operate in a wake-up state during the DW duration to transmit or receive a message and may operate in a sleep state in a duration except for the DW duration. In the sleep state, the electronic devices 201, 202, 203, and 204 may reduce power consumption by disabling at least some of components (e.g., a processor 120, a communication module 190, or an antenna module 197 of FIG. 1).

According to an embodiment, the first electronic device 201 and the second electronic device 202 may perform data communication. The data communication may refer to an operation where user data (e.g., a chat text, an image, or contact information) except for a control message for establishing a path between the first electronic device 201 and the second electronic device 202 is transmitted. For example, the first electronic device 201 and the second electronic device 202 may establish a path between the first electronic device 201 and the second electronic device 202 using the tunneled direct link setup (TDLS) technology, but may be influenced by a connection state of the AP 206 because the TDLS technology is on the assumption that the first electronic device 201 and the second electronic device 202 are connected to the AP 206. For another example, the first electronic device 201 and the second electronic device 202 may perform data communication based on a NAN data path (NDP) using the NAN protocol. For example, the NDP may refer to a path based on being disconnected, which is established (or set up) for the first electronic device 201 and the second electronic device 202 to perform data communication in a duration except for a specified DW duration. The first electronic device 201 and the second electronic device 202 may reduce a setup time for performing data communication by establishing an NDP based on being disconnected.

Figure 3:
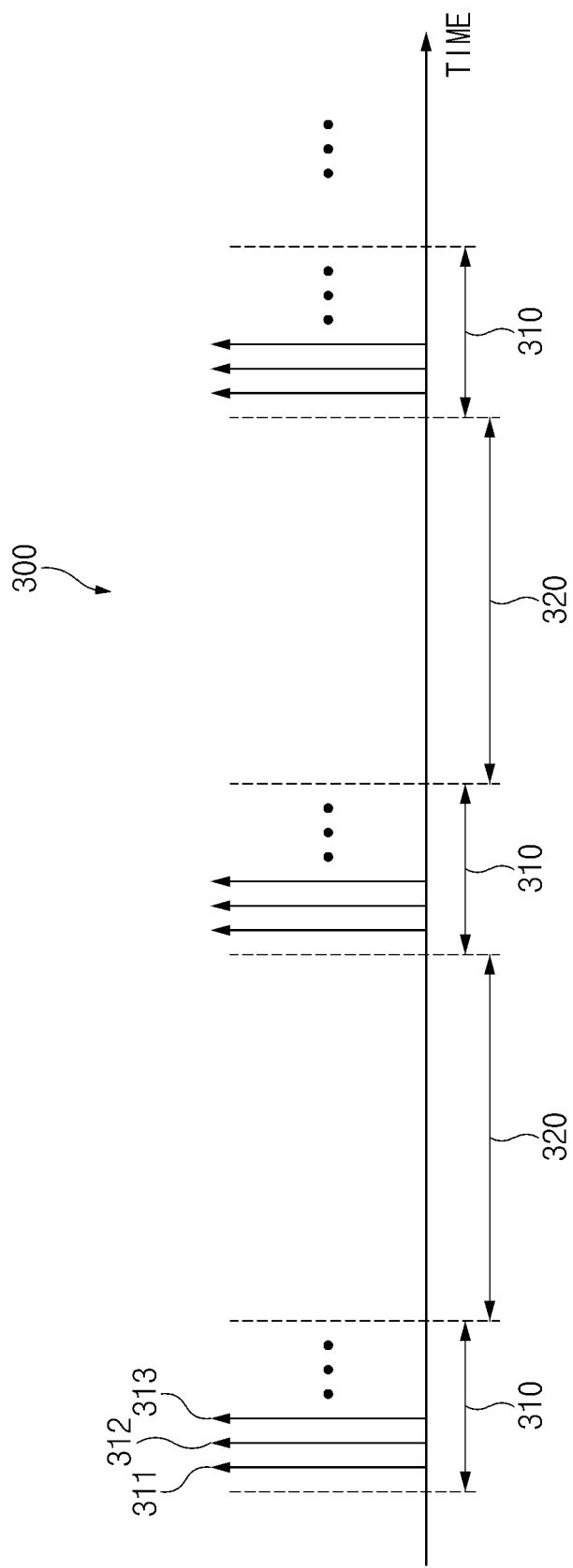
FIG. 3 illustrates a DW duration based on a NAN protocol according to various embodiments.

FIG. 3 illustrates a DW duration 310 based on a NAN protocol according to various embodiments.

Referring to FIG. 3, a graph 300 describes an operation where electronic devices 201, 202, 203, and 204 included in a NAN cluster 220 of FIG. 2 transmit a message over time. The electronic devices 201, 202, 203, and 204 may transmit or receive at least one message (e.g., 311, 312, or 313). The message transmitted in the DW duration 310 may include at least one of, for example, a synchronization beacon frame, a service discovery frame, or an action frame. The action frame may include a message used to establish an NDP in a duration 320 except for the DW duration 310 or a message for measuring a distance (e.g., NAN ranging) between the electronic devices 201, 202, 203, and 204 included in the NAN cluster 220.

According to an embodiment, the first electronic device 201 and the second electronic device 202 may dynamically determine a time resource or a channel resource in the duration 320 except for the DW duration 310 by transmitting a message (e.g., an NDP request message or an NDP response message) for establishing the NDP in the DW duration 310. For example, the time resource or the channel resource may be determined by an electronic device which requests to establish the NDP or may be determined through a negotiation procedure between the first electronic device 201 and the second electronic device 202.

According to an embodiment, the first electronic device 201 and the second electronic device 202 may establish the NDP and may transmit encrypted data based on the NDP in the duration 320 except for the DW duration 310. According to an embodiment, the first electronic device 201 and the second electronic device 202 may insert information associated with a link based on a heterogeneous protocol in a message for establishing the NDP.

Figure 4:
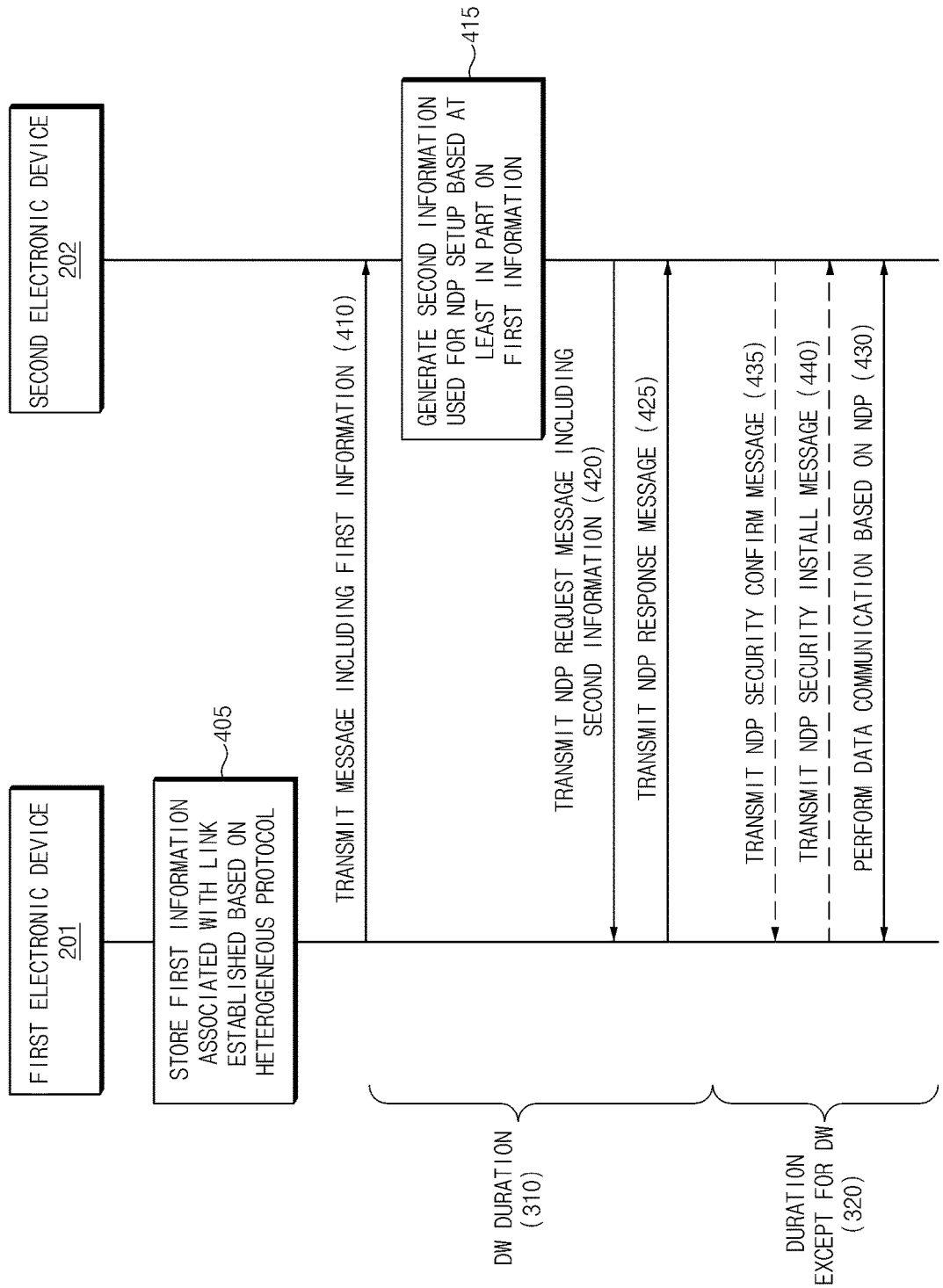
FIG. 4 illustrates a signal sequence diagram for performing data communication based on an NDP based on first information associated with a link established based on a heterogeneous protocol according to various embodiments.

FIG. 4 illustrates a signal sequence diagram for performing data communication based on an NDP based on first information associated with a link established based on a heterogeneous protocol according to various embodiments. A signal sequence diagram 400 of FIG. 4 illustrates an embodiment where the first electronic device 201 transmits a message including first information and a second electronic device 202 transmits an NDP request message. However, the first electronic device 201 may perform the operation of the second electronic device 202, and the second electronic device 202 may perform the operation of the first electronic device 201.

Referring to FIG. 4, in the network environment (e.g., a network environment 200 of FIG. 2), the first electronic device 201 and the second electronic device 202 may be included in a NAN cluster 220. According to an embodiment, the first electronic device 201 and the second electronic device 202 may form the NAN cluster 220 before operation 410 is performed. For example, the first electronic device 201 and the second electronic device 202 may form the NAN cluster 220 before operation 405 is performed or before operation 410 is performed after operation 405 is performed.

In operation 405, the first electronic device 201 may store first information associated with a link established based on a heterogeneous protocol different from a NAN protocol. The first information may include at least one of profile IDs of a link to which the first electronic device 201 is previously connected or a link having a history where the first electronic device 201 is previously connected. The previously connected link or the link having the connected history may refer to, for example, a link based on a Wi-Fi protocol between the first electronic device 201 and an AP 206 of FIG. 1. For example, the first information may include at least one of a service set ID (SSID) indicating a heterogeneous network (e.g., Wi-Fi) to which the first electronic device 201 is connected, a basic SSID (BSSID) indicating a medium access control (MAC) address of the AP 206, or a group ID indicating a group including the first electronic device 201 in Wi-Fi direct.

Although not illustrated in FIG. 4, the second electronic device 202 may store the first information associated with the link established based on the heterogeneous protocol. A profile ID (e.g., an SSID, a BSSID, or a group ID) of at least a portion of the first information stored in the second electronic device 202 and a profile ID of at least a portion of the first information stored in the first electronic device 201 may be the same as each other. For example, when connected to the same AP (e.g., the AP 206), the first electronic device 201 and the second electronic device 202 may store the same SSID.

In operation 410, the first electronic device 201 may transmit a message including the first information to the second electronic device 202 during a DW duration 310. The message including the first information may include, at least one of, for example, a synchronization beacon frame, a service discovery frame, or an action frame.

According to an embodiment, the message including the first information may include an ID for NDP security setup other than the first information. For example, the message including the first information may include at least one of a cipher suite ID (CSID) or a security context ID (SCID). The CSID may indicate a cipher suite of an algorithm used for encryption technology. The SCID may be used to define an algorithm or parameter used to process an encrypted message or may be used to identify a key. For example, the format for an attribute of the SCID defined in the NAN specification may be represented as Table 1 below.

In operation 415, the second device 202 may fail to receive a user input selecting information (e.g., a PMK or a PMKID) used for NDP setup from an upper layer (e.g., an application layer) and may generate second information (e.g., a PMKID) used for NDP setup based at least in part on a message including the first information received from the first electronic device 201. According to an embodiment, the second electronic device 202 may determine the same profile ID as at least one profile ID stored in the second electronic device 202 among at least one profile ID included in the first information received from the first electronic device 201. The second electronic device 202 may determine a key (e.g., a PMK) corresponding to the determined profile ID and may generate the second information (e.g., the PMKID) used for NDP setup based on the determined key. For example, when the second information is the PMKID, the second electronic device 202 may generate the PMKID through Equation 1 below.

$$PMKID = L(HMAC\text{-}Hash(PMK, \text{``NANPMKName''} \| IAddr \| RAddr \| ServiceID), 0, 128) \quad [\text{Equation 1}]$$

In Equation 1, IAddr may refer to the interface address of the initiator (e.g., the second electronic device 202), and RAddr may refer to the interface address of a responder (e.g., the first electronic device 201). Service ID may refer to the ID of the service providing the PMK. HMAC-Hash may refer to the hash function specific to the cipher suite included in the CSID.

In operation 420, the second electronic device 202 may transmit an NDP request message including the second information to the first electronic device 201 during the DW duration 310. According to an embodiment, the NDP request message may include at least one of an SCID or a CSID used for NDP security setup. According to an embodiment, when the second information is the PMKID, the second information may be included in the SCID. According to an embodiment, the NDP request message may further include a profile ID determined by the second electronic device 202. According to an embodiment, the second electronic device 202 may transmit a key (e.g., a PMK) used to generate the second information, rather than the second information, to the first electronic device 201 through the NDP request message.

In operation 425, the first electronic device 201 may transmit an NDP response message to the second electronic device 202 based at least in part on the second information included in the NDP request message. According to an embodiment, when the second information included in the NDP request message is valid information, the first elec-

TABLE 1

| Field | Size (octets) | Value | Description |
|---|---|---|---|
| Security Context Identifier Type Length | 2 | Variable | Identifies the length of the Security Context Identifier field |
| Security Context Identifier Type | 1 | Variable | The type of Security Context Identifier. 0 - Reserved 1 - PMKID 2 - 255: Reserved |
| Publish ID | 1 | Variable | Identifies the Publish Service Instance |
| Security Context Identifier | Variable | Variable | Identifies the Security Context. For NAN Shared Key Cipher Suite, this field contains the 16 octet PMKID identifying the PMK used for setting up the Secure Data Path. |

In Table 1, the type of the SCID may be a pairwise master key ID (PMKID) defined in IEEE 802.11.

tronic device 201 may transmit the NDP response message. For example, when the second information is the PMKID, the first electronic device 201 may determine that the second information valid when a value calculated using the PMKID and a specified equation is the same as a profile ID stored in the first electronic device 201.

In operation 430, the first electronic device 201 and the second electronic device 202 may perform data communication based on an NDP in a duration 320 except for the DW duration 310.

According to an embodiment, the first electronic device 201 and the second electronic device 202 may perform an additional operation for establishing the NDP before performing operation 430. For example, in operation 435, the second electronic device 202 may transmit a security confirm message in response to the NDP response message. In operation 440, the first electronic device 201 may transmit an NDP security install message in response to the NDP security confirm message. As shown in FIG. 4, operation 435 and operation 440 may be performed in the duration 320 except for the DW duration 310 or may be performed in the DW duration 310.

As described above, the first electronic device 201 and the second electronic device 202 may establish a secure NDP without receiving a user input from an upper layer by using information (e.g., a profile ID) associated with the link established based on the heterogeneous protocol.

Figure 5:
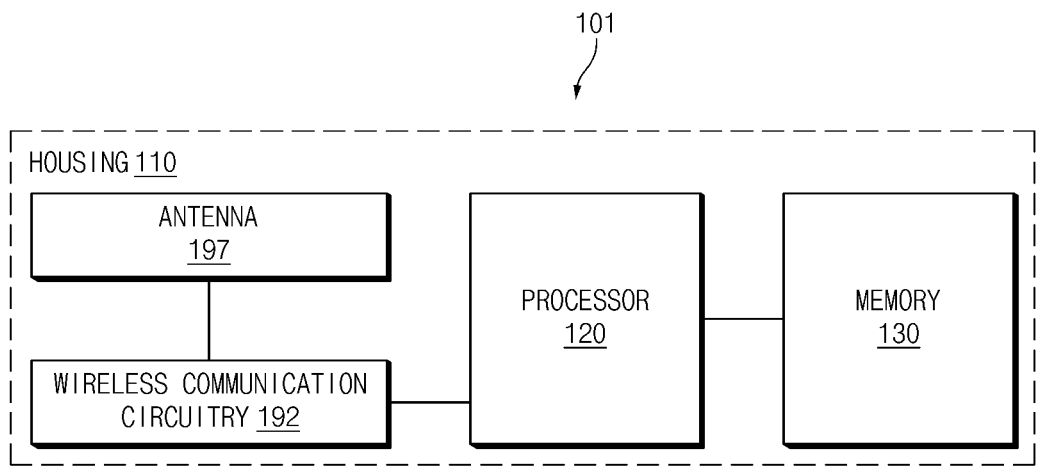
FIG. 5 illustrates a block diagram of an electronic device for performing data communication based on an NDP based on first information associated with a link established based on a heterogeneous protocol according to various embodiments.

FIG. 5 illustrates a block diagram of an electronic device 101 for performing data communication based on an NDP based on first information associated with a link established based on a heterogeneous protocol according to various embodiments. The block diagram of the electronic device 101 shown in FIG. 5 is applicable to a first electronic device 201 or a second electronic device 202.

Referring to FIG. 5, the electronic device 101 may include a housing 110, a processor 120, a memory 130, at least one antenna 197 (e.g., an antenna module 197 of FIG. 1), and a wireless communication circuitry 192 (e.g., a wireless communication module 192 of FIG. 1). According to an embodiment, the electronic device 101 may further include at least one of component shown in FIG. 1 other than the components shown in FIG. 5.

According to an embodiment, the at least one antenna 197 may radiate a signal for performing wireless communication or may receive a signal transmitted from an external electronic device (e.g., the first electronic device 201 or the second electronic device 202).

According to an embodiment, the wireless communication circuitry 192 may be electrically connected with the at least one antenna 197. The wireless communication circuitry 192 may process a signal radiated through the at least one antenna 197 or may process a signal received via the at least one antenna 197. According to an embodiment, the wireless communication circuitry 192 may support a NAN protocol and a heterogeneous protocol.

According to an embodiment, the processor 120 may be operatively connected with the at least one antenna 197 and the wireless communication circuitry 192. The processor 120 may perform the overall function of the electronic device 101 for performing wireless communication.

For example, when the electronic device 101 is an electronic device (e.g., the first electronic device 201 of FIG. 4) which transmits a message including first information, the processor 120 may store the first information associated with a link established based on a heterogeneous protocol in the memory 130. The processor 120 may transmit the message including the first information to an external electronic device (e.g., the second electronic device 202) during a DW duration 210 through the wireless communication circuitry 192 and may receive an NDP request message including second information from the external electronic device. The processor 120 may transmit an NDP response message to the external electronic device based at least in part on the second information included in the NDP request message and may perform data communication based on an NDP with the external electronic device during a duration 320 except for the DW duration 310.

For another example, when the electronic device 101 is an electronic device (e.g., the second electronic device 202 of FIG. 4) which generates the second information, the processor 120 may receive the message including the first information from the external electronic device (e.g., the first electronic device 201) during the DW duration 310 and may generate the second information used for NDP setup based at least in part on the first information. The processor 120 may transmit the NDP request message including the second information to the external electronic device during the DW duration 310 through the wireless communication circuitry 192 and may receive an NDP response message from the external electronic device. The processor 120 may perform data communication based on an NDP during the duration 320 except for the DW duration 310 with the external electronic device.

According to an embodiment, the memory 130 may be operatively connected with the processor 120. The memory 130 may store instructions used for the processor 120 to perform the overall function of the electronic device 101. For another example, the memory 130 may store the first information or the second information.

Figure 6:
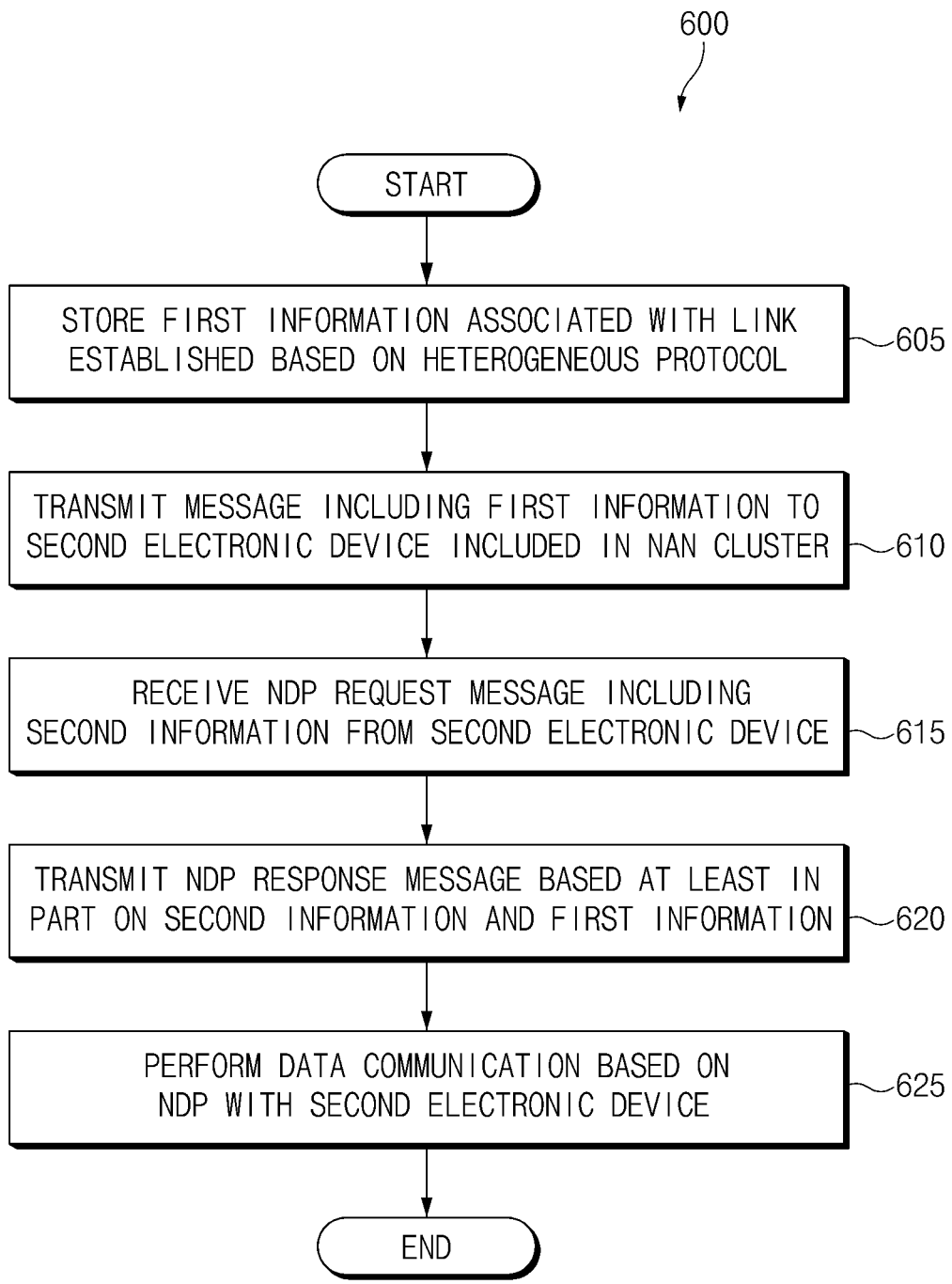
FIG. 6 illustrates an operational flowchart of a first electronic device for performing data communication based on an NDP based on first information associated with a link established based on a heterogeneous protocol according to various embodiments.

FIG. 6 illustrates an operational flowchart of a first electronic device 201 for performing data communication based on an NDP based on first information associated with a link established based on a heterogeneous protocol according to various embodiments. Operations shown in an operational flowchart 600 of FIG. 6 may be performed by a first electronic device 201 or a component (e.g. a processor 120) of the first electronic device 201.

Referring to FIG. 6, in operation 605, the first electronic device 201 may store first information associated with a link established based on a heterogeneous protocol. The heterogeneous protocol may include at least one of, for example, Wi-Fi (or legacy Wi-Fi), Wi-Fi direct, mobile hotspot, IBBS, Bluetooth, BLE, or mesh. The first information may include at least one of profile IDs (e.g., an SSID, a BSSID, or a group ID) of a link to the first electronic device 201 is previously connected or a link having a history where the first electronic device 201 is previously connected. For example, referring to FIG. 2, the first electronic device 201 may store information associated with a link established between the first electronic device 201 and an AP 206.

In operation 610, the first device 201 may transmit a message including the first information to a second electronic device 202 included in a NAN cluster 220. According to an embodiment, the NAN cluster including the first electronic device 201 and the second electronic device 202 may be formed before operation 610. For example, the first electronic device 201 may form the NAN cluster with the second electronic device 202 after storing the first information in operation 605 and may form the NAN cluster with the second electronic device 202 before performing operation 605. According to an embodiment, the first electronic device 201 may transmit the message including the first information during a DW duration 310. For example, the message including the first information may include at least one of a synchronization beacon frame, a service discovery frame, or an action frame. According to an embodiment, the message including the first information may further include at least one of a CSID or an SCID used for NDP setup.

According to an embodiment, the first electronic device 201 may transmit the message including the first information in a unicast scheme and may transmit the message in a broadcasting scheme, in response to receiving at least one of the synchronization beacon frame, the service discovery frame, or the action frame from the second electronic device 202.

In operation 615, the first electronic device 201 may receive an NDP request message including second information from the second electronic device 202. According to an embodiment, the first electronic device 201 may receive the NDP request message during the DW duration 310. For example, the second information may include an ID (e.g., a PMKID) used for NDP setup. According to an embodiment, the NDP request message may include the same profile ID as a profile ID included in the first information among profile IDs previously stored in the second electronic device 202 or a key (e.g., a PMK) corresponding to the same profile ID, other than the second information.

In operation 620, the first electronic device 201 may transmit an NDP response message to the second electronic device 202 based at least in part on the second information and the first information. According to an embodiment, the first electronic device 201 may calculate a value (e.g., a PMKID) indicated by the second information and may transmit the NDP response message when the calculated result value is the same as a profile ID previously stored in the first electronic device 201. According to an embodiment, the first electronic device 201 may fail to calculate the value indicated by the second information and may transmit the NDP response message when the profile ID included in the NDP request message is the same as the profile ID previously stored in the first electronic device 201.

In operation 625, the first device 201 may perform data communication based on an NDP with the second electronic device 202. For example, the first device 201 may exchange encrypted data with the second electronic device 202.

Figure 7:
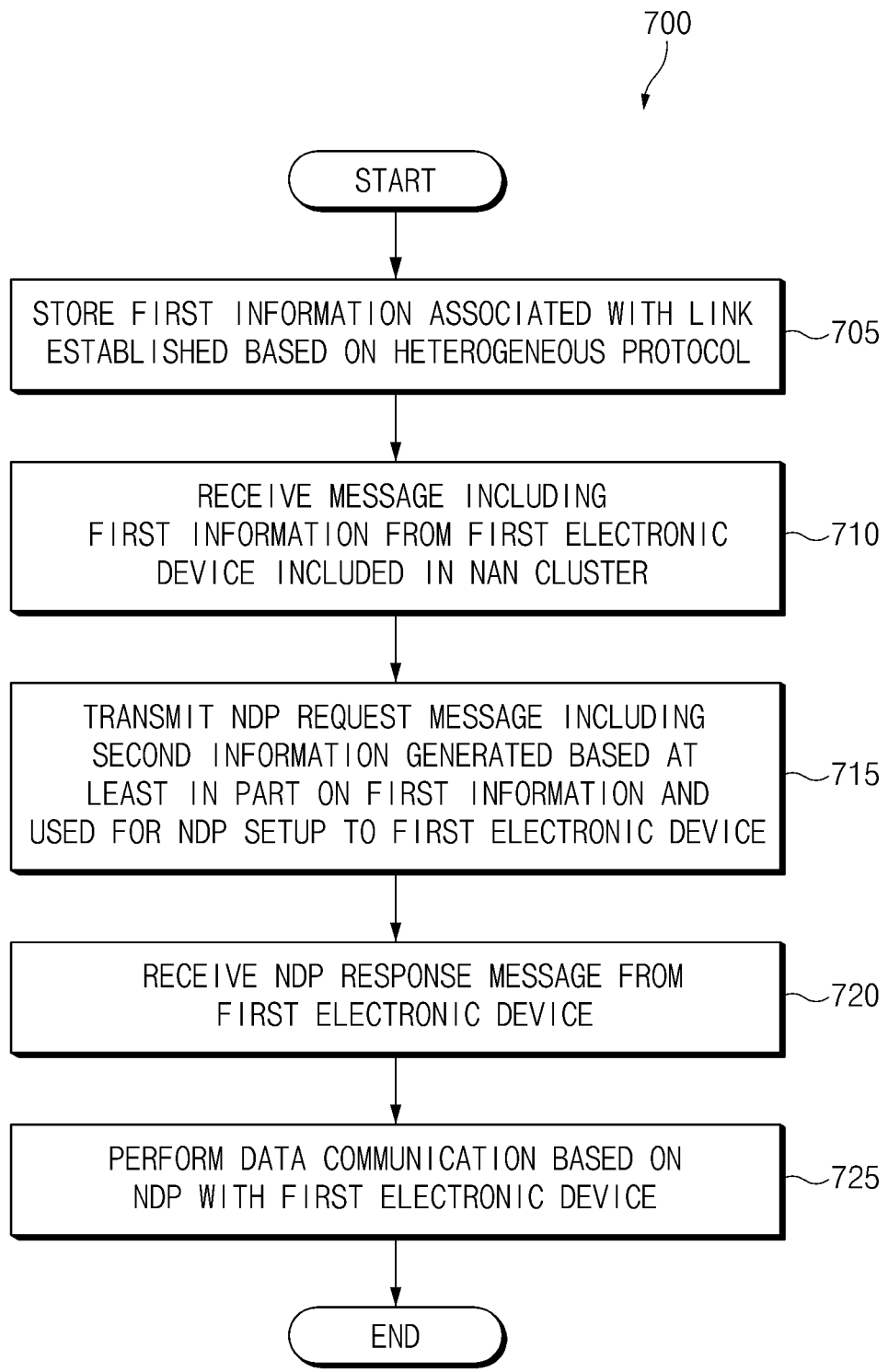
FIG. 7 illustrates an operational flowchart of a second electronic device for performing data communication based on an NDP based on first information associated with a link established based on a heterogeneous protocol according to various embodiments.

FIG. 7 illustrates an operational flowchart of a second electronic device 202 for performing data communication based on an NDP based on first information associated with a link established based on a heterogeneous protocol according to various embodiments. Operations shown in an operational flowchart 700 of FIG. 7 may be performed by a second electronic device 202 or a component (e.g. a processor 120) of the second electronic device 202.

Referring to FIG. 7, in operation 705, the second electronic device 202 may store first information associated with a link established based on a heterogeneous protocol. For example, referring to FIG. 2, the second electronic device 202 may store information about a link established between the second electronic device 202 and an AP 206. The first information may include at least one of, for example, an SSID, a BSSID, or a group ID.

In operation 710, the second electronic device 202 may receive a message including the first information from a first electronic device 201 included in a NAN cluster. According to an embodiment, the NAN cluster including the first electronic device 201 and the second electronic device 202 may be formed before operation 710. For example, the second electronic device 202 may form the NAN cluster with the first electronic device 201 after storing the first information in operation 705 and may form the NAN cluster with the first electronic device 201 before performing operation 705. According to an embodiment, the second electronic device 202 may receive the message including the first information during a DW duration 310. The message including the first information may include, at least one of, for example, a synchronization beacon frame, a service discovery frame, or an action frame.

In operation 715, the second electronic device 202 may transmit an NDP request message including second information, which is generated based at least in part on the first information and is used for NDP setup, to the first electronic device 201. According to an embodiment, the second electronic device 202 may transmit the NDP request message during the DW duration 310. According to an embodiment, the second electronic device 202 may determine the same profile ID as a profile ID (e.g., an SSID, a BSSID, or a group ID) of the first information stored in the second electronic device 202 among profiles of the first information received from the first electronic device 201 and may generate the second information based on the determined profile ID. According to an embodiment, the NDP request message may further include a profile ID determined by the second electronic device 202 or a key corresponding to the profile ID, other than the second information, or may include a profile ID or a key (e.g., a PMK) corresponding to the profile ID, rather than the second information.

In operation 720, the second electronic device 202 may receive an NDP response message from the first electronic device 201. In operation 725, the second electronic device 202 may perform data communication based on an NDP with the first electronic device 201.

As described above, an electronic device (e.g., an electronic device 101 of FIG. 1 or a first electronic device 201 of FIG. 4) supporting a NAN protocol and a heterogeneous protocol different from the NAN protocol may include at least one antenna (e.g., an antenna 197 of FIG. 5), a wireless communication circuitry (e.g., a wireless communication circuitry 192 of FIG. 5) electrically connected with the at least one antenna, a processor (e.g., a processor 120 of FIG. 5) operatively connected with the wireless communication circuitry, and a memory (e.g., a memory 130 of FIG. 5) operatively connected with the processor. The memory may store instructions, when executed, causing the processor to store first information associated with a link established based on the heterogeneous protocol, transmit a message including the first information to an external electronic device (e.g., a second electronic device 202 of FIG. 4) included in a NAN cluster, via the wireless communication circuitry, receive an NDP request message including second information associated with an NDP from the external electronic device, transmit an NDP response message to the external electronic device based at least in part on the second information and the first information, and perform data communication with the external electronic device based on the NDP.

According to an embodiment, the heterogeneous protocol may include at least one of Wi-Fi, Wi-Fi direct, mobile hotspot, IBBS, Bluetooth, BLE, or mesh.

According to an embodiment, the instructions may cause the processor to transmit the message including the first information during a DW duration based on the NAN protocol, receive the NDP request message during the DW duration, and perform data communication based on the NDP during a duration except for the DW duration.

According to an embodiment, the message including the first information may include at least one of a synchronization beacon frame, a service discovery frame, or an action frame.

According to an embodiment, the first information may include at least one of profile IDs associated with the link, and the profile ID may refer to an SSID, a BSSID, or a group ID.

According to an embodiment, the second information may include a pairwise master key ID (PMKID).

According to an embodiment, the instructions may cause to the processor to calculate the PMKID included in the second information based on a specified equation, in response to receiving the NDP request message, identify whether the calculated value is the same as a profile ID stored in the electronic device, and transmit the NDP response message, when the calculated value is the same as the profile ID stored in the electronic device.

According to an embodiment, the message including the first information may further include at least one of a CSID or an SCID.

As described above, an electronic device (e.g., an electronic device 101 of FIG. 1 or a second electronic device 202 of FIG. 4) supporting a NAN protocol and a heterogeneous protocol different from the NAN protocol may include at least one antenna (e.g., an antenna 197 of FIG. 5), a wireless communication circuitry (e.g., a wireless communication circuitry 192 of FIG. 5) electrically connected with the at least one antenna, a processor (e.g., a processor 120 of FIG. 5) operatively connected with the wireless communication circuitry, and a memory (e.g., a memory 130 of FIG. 5) operatively connected with the processor. The memory may store instructions, when executed, causing the processor to store first information associated with a link established based on the heterogeneous protocol, receive a message including the first information from an external electronic device (e.g., a first electronic device 201 of FIG. 4) included in a NAN cluster, via the wireless communication circuitry, transmit an NDP request message including second information generated based at least in part on first information included in the message and used to establish an NDP to the external electronic device, receive an NDP response message from the external electronic device, and perform data communication with the external electronic device based on the NDP.

According to an embodiment, the heterogeneous protocol may include at least one of Wi-Fi, Wi-Fi direct, mobile hotspot, IBBS, Bluetooth, BLE, or mesh.

According to an embodiment, the instructions may cause the processor to receive a message including the first information during a DW duration based on the NAN protocol, transmit the NDP request message during the DW duration, receive the NDP response message during the DW duration, and perform data communication based on the NDP during a duration except for the DW duration.

According to an embodiment, the message including the first information may include at least one of a synchronization beacon frame, a service discovery frame, or an action frame.

According to an embodiment, the first information may include at least one of profile IDs associated with the link, and the profile ID may refer to an SSID, a BSSID, or a group ID.

According to an embodiment, the second information may include a PMKID, and the instructions may cause the processor to determine the same profile ID as a profile ID of the first information stored in the electronic device, among profile IDs included in the message including the first information and generate the PMKID based at least in part on the determined profile ID.

According to an embodiment, the instructions may cause the processor to generate the PMKID based at least in part on a PMK and a hash function corresponding to the determined profile ID.

As described above, a method of an electronic device (e.g., an electronic device 101 of FIG. 1 or a first electronic device 201 of FIG. 4) supporting a NAN protocol and a heterogeneous protocol different from the NAN protocol may include storing first information associated with a link established based on the heterogeneous protocol, transmitting a message including the first information to an external electronic device (e.g., a second electronic device 202 of FIG. 4) included in a NAN cluster, during a DW duration based on the NAN protocol, receiving an NDP request message including second information associated with an NDP from the external electronic device, during the DW duration, transmitting an NDP response message to the external electronic device based at least in part on the second information and the first information, during the DW duration, and performing data communication with the external electronic device based on the NDP, during a duration except for the DW duration.

According to an embodiment, the message including the first information may include at least one of a synchronization beacon frame, a service discovery frame, or an action frame.

According to an embodiment, the first information may include at least one of profile IDs associated with the link, and the profile ID may refer to an SSID, a BSSID, or a group ID, and the second information may include a PMKID.

According to an embodiment, the method may further include calculating the PMKID included in the second information based on a specified equation, in response to receiving the NDP request message, identifying whether the calculated value is the same as a profile ID stored in the electronic device, and transmitting the NDP response message, when the calculated value is the same as the profile ID stored in the electronic device.

According to an embodiment, the message including the first information may further include at least one of a CSID or an SCID.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device supporting a neighbor awareness networking (NAN) protocol and a communication protocol different from the NAN protocol, the electronic device comprising:
    an antenna;
    wireless communication circuitry electrically connected with the antenna;
    a processor operatively connected with the wireless communication circuitry; and
    a memory operatively connected with the processor,
    wherein the memory stores instructions, when executed by the processor, causing the electronic device to:
        obtain, via the wireless communication circuitry, identification information corresponding to the electronic device and configured to be used for a wireless communication based on the communication protocol;
        transmit, via the wireless communication circuitry, a message including the identification information to an external electronic device included in a NAN cluster together with the electronic device;
        receive, via the wireless communication circuitry, a NAN data path (NDP) request message including security information being verified by the electronic device from the external electronic device;
        transmit, via the wireless communication circuitry, a NDP response message to the external electronic device based at least in part on the security information, such that a NDP is to be established between the electronic device and the external device; and
        perform data communication with the external electronic device based on the NDP.

2. The electronic device of claim 1, wherein the instructions, when executed by the processor, cause the electronic device to perform the data communication using a security key corresponding to the security information between the electronic device and the external electronic device.

3. The electronic device of claim 1, wherein the instructions, when executed by the processor, cause the electronic device to:
    perform the transmitting of the message and the receiving of the NDP request message during a discovery window according to the NAN protocol.

4. The electronic device of claim 1, wherein the instructions, when executed by the processor, cause the electronic device to:
    after the NDP response message is transmitted, receive, via the wireless communication circuitry, a NDP security confirm message from the external electronic device, the NDP security confirm message generated based at least in part on the security information, and
    in response to the NDP security confirm message, transmit, via the wireless communication circuity, a NDP security install message to the external electronic device.

5. The electronic device of claim 4,
    wherein the NDP security confirm message is received during a discovery window according to the NAN protocol, and wherein the NDP security install message is transmitted during the discovery window.

6. The electronic device of claim 1, wherein the security information is generated based on identification information of a service.

7. The electronic device of claim 1, wherein the communication protocol includes Wi-Fi direct.

8. An electronic device supporting a neighbor awareness networking (NAN) protocol and a communication protocol different from the NAN protocol, the electronic device comprising:
an antenna;
a wireless communication circuitry electrically connected with the at least one antenna;
a processor operatively connected with the wireless communication circuitry; and
a memory operatively connected with the processor,
wherein the memory stores instructions, when executed by the processor, causing the electronic device to:
receive, via the wireless communication circuitry, a message including identification information from an external electronic device included in a NAN cluster together with the electronic device, via the wireless communication circuitry, identification information corresponding to the external electronic device and configured to be used for a wireless communication based on the communication protocol;
transmit, via the wireless communication circuitry, a NAN data path (NDP) request message, the NDP request message including security information to be verified by the external electronic device, such that a NDP is to be established between the electronic device and the external device;
receive, via the wireless communication circuitry, an NDP response message from the external electronic device; and
perform data communication with the external electronic device based on the NDP.

9. The electronic device of claim 8, wherein the instructions, when executed by the processor, cause the electronic device to perform the data communication using a security key corresponding to the security information between the electronic device and the external electronic device.

10. The electronic device of claim 8, wherein the instructions, when executed by the processor, cause the electronic device to:
perform the transmitting of the message and the receiving of the NDP request message during a discovery window according to the NAN protocol.

11. The electronic device of claim 8, wherein the instructions, when executed by the processor, cause the electronic device to:
after the NDP response message is received, transmit, via the wireless communication circuitry, a NDP security confirm message to the external electronic device, the NDP security confirm message generated based at least in part on the security information, and
after transmitting the NDP security confirm message, receive, via the wireless communication circuity, a NDP security install message from the external electronic device.

12. The electronic device of claim 11,
wherein the NDP security confirm message is transmitted during a discovery window according to the NAN protocol, and
wherein the NDP security install message is received during the discovery window.

13. The electronic device of claim 8, wherein the security information is generated based on identification information of a service.

14. The electronic device of claim 8, wherein the communication protocol includes Wi-Fi direct.

15. A method of an electronic device supporting a neighbor awareness networking (NAN) protocol and a communication protocol different from the NAN protocol, the method comprising:
obtaining, via a wireless communication circuitry of the electronic device, identification information corresponding to the electronic device and configured to be used for a wireless communication based on the communication protocol;
transmitting, via the wireless communication circuitry, a message including the identification information to an external electronic device included in a NAN cluster together with the electronic device;
receiving, via the wireless communication circuitry, a NAN data path (NDP) request message including security information being verified by the electronic device from the external electronic device;
transmitting, via the wireless communication circuitry, a NDP response message to the external electronic device based at least in part on the security information, such that a NDP is to be established between the electronic device and the external device; and
performing data communication with the external electronic device based on the NDP.

16. The method of claim 15, wherein performing the data communication further comprises:
performing the data communication using a security key corresponding to the security information between the electronic device and the external electronic device.

17. The method of claim 15,
wherein the message is transmitted during a discovery window according to the NAN protocol, and
wherein the NDP request message is received during the discovery window.

18. The method of claim 15, further comprising:
after the NDP response message is transmitted, receiving, via the wireless communication circuitry, a NDP security confirm message from the external electronic device, the NDP security confirm message generated based at least in part on the security information, and
in response to the NDP security confirm message, transmitting, via the wireless communication circuity, a NDP security install message to the external electronic device.

19. The method of claim 18,
wherein the NDP security confirm message is received during a discovery window according to the NAN protocol, and
wherein the NDP security install message is transmitted during the discovery window.

20. The method of claim 15, wherein the communication protocol includes Wi-Fi direct.

* * * * *